US012771792B2

(12) United States Patent
Nakane et al.

(10) Patent No.: US 12,771,792 B2
(45) Date of Patent: Oct. 20, 2026

(54) INFORMATION DISPLAY DEVICE DISPLAYING SCREEN FOR IDENTIFYING CAUSES OF TROUBLES, METHOD FOR DISPLAYING INFORMATION, AND PROGRAM FOR CAUSING COMPUTER TO EXECUTE THE METHOD

(71) Applicant: Konica Minolta, Inc., Tokyo (JP)

(72) Inventors: Yoshiki Nakane, Toyokawa (JP); Masayasu Haga, Toyokawa (JP); Sayaka Morita, Gamagori (JP)

(73) Assignee: Konica Minolta, Inc., Tokyo (JP)

( * ) Notice: Subject to any disclaimer, the term of this patent is extended or adjusted under 35 U.S.C. 154(b) by 309 days.

(21) Appl. No.: 18/593,336

(22) Filed: Mar. 1, 2024

(65) Prior Publication Data

US 2025/0337845 A1 Oct. 30, 2025

(51) Int. Cl.
*H04N 1/00* (2006.01)
*G06F 3/12* (2006.01)

(52) U.S. Cl.
CPC ....... *H04N 1/00074* (2013.01); *G06F 3/1208* (2013.01); *G06F 3/1256* (2013.01); *H04N 1/00029* (2013.01); *H04N 1/0009* (2013.01); *H04N 1/00413* (2013.01); *G06F 3/1211* (2013.01); *H04N 2201/0094* (2013.01)

(58) Field of Classification Search
None
See application file for complete search history.

(56) References Cited

U.S. PATENT DOCUMENTS

2019/0281171 A1* 9/2019 Hayashi ............. H04N 1/00045
2024/0004596 A1* 1/2024 Shibata .............. G03G 15/5062
2024/0114096 A1* 4/2024 Imai ................... H04N 1/00029
(Continued)

FOREIGN PATENT DOCUMENTS

JP 06-127831 A 5/1994
JP 2007325194 A 12/2007
(Continued)

OTHER PUBLICATIONS

Japanese Office Action mailed Jun. 2, 2026 and issued for Japanese patent application No. 2023-054799 and its English machine translation.

*Primary Examiner* — Miya J Cato
(74) *Attorney, Agent, or Firm* — RANKIN, HILL & CLARK LLP

(57) ABSTRACT

An information providing device includes: an input device that accepts an input to the information providing device; a display device that displays a screen; a control device that controls an operation of the information providing device; and a storage device that stores trouble candidates that may occur in the information providing device, wherein the trouble candidates are associated with phenomena in the information providing device, each of the phenomena is associated with one or more causes, the control device displays the trouble candidates on the display device based on the input, the control device displays one or more phenomena associated with a selected trouble candidate based on selection of any of the trouble candidates, and the control device displays one or more causes associated with the selected phenomenon on the display device based on selection of any of the one or more phenomena.

15 Claims, 12 Drawing Sheets

(56) References Cited

U.S. PATENT DOCUMENTS

2024/0402964 A1* 12/2024 Kunimoto ............ G06Q 30/016
2025/0390257 A1* 12/2025 Narita ..................... G06F 3/121

FOREIGN PATENT DOCUMENTS

JP 2017083544 A 5/2017
JP 2019102843 A 6/2019
JP 2019116007 A 7/2019

* cited by examiner

51

510

520

| CONDITION NUMBER | CONTENT OF IMAGE FORMATION CONDITION | SETTING DATE AND TIME |
|---|---|---|
| 001 | ... | ... |
| 002 | ... | ... |
| ... | ... | ... |

530

| USER NUMBER | USER NAME | ORDER OF CHANGE IN PREFERENCE OF IMAGE QUALITY |
|---|---|---|
| 001 | ... | ... |
| 002 | ... | ... |
| ... | ... | ... |

INFORMATION DISPLAY DEVICE DISPLAYING SCREEN FOR IDENTIFYING CAUSES OF TROUBLES, METHOD FOR DISPLAYING INFORMATION, AND PROGRAM FOR CAUSING COMPUTER TO EXECUTE THE METHOD

The entire disclosure of Japanese patent Application No. 2023-054799, filed on Mar. 30, 2023, is incorporated herein by reference in its entirety.

BACKGROUND

Technological Field

The present disclosure relates to display of information, and more particularly to a technique of displaying information when a trouble occurs in a device.

Description of the Related Art

An information processing device, a control device, a processing device, or other various devices execute a plurality of processes. For example, an image forming process by an image forming device involves many steps. Therefore, in a case where an image defect occurs, technical knowledge regarding the image forming device is required in order to identify in which process the image defect is occurring.

For example, JP 2019-102843 A discloses a technique "to accurately identify a type of an image defect without requiring a user's knowledge on the image defect when the image defect is generated" (see [Abstract]). JP 2017-083544 A discloses "an image processing device which can reduce service time of a service person and use of media and toner at the occurrence of failure and can suppress cost" (see [Abstract]). JP 2007-325194 A discloses a technique "to enable users to diagnose a failure in a device by themselves precisely without imposing time and trouble for self-diagnosis, such as the reference of a manual for checking the failure, on the users as much as possible, and to cope with the recovery from the failure quickly" (see [Abstract]). JP 2019-116007 A discloses "a failure diagnosis system which has a good detection accuracy of a failure component and can reduce a down time, and a failure diagnosis method" (see [Abstract]).

However, troubles that occur in an image forming device are not limited to troubles related to image quality, and include various troubles such as abnormal noise, off-flavor, and paper jam. Therefore, in the conventional techniques described above, it is not possible to identify the causes of all the troubles occurring in an image forming device. Accordingly, there is a need for a technique of identifying causes of various troubles.

SUMMARY

The present disclosure has been made in view of the background described above, and one object in one aspect is to provide a technique of identifying causes of various troubles occurring in a device.

To achieve the abovementioned object, according to an aspect of the present invention, an information providing device reflecting one aspect of the present invention comprises: an input device that accepts an input to the information providing device; a display device that displays a screen; a control device that controls an operation of the information providing device; and a storage device that stores each of a plurality of trouble candidates that may occur in the information providing device, wherein the plurality of trouble candidates are respectively associated with a plurality of phenomena in the information providing device, each of the plurality of phenomena is associated with one or more causes, the control device displays the plurality of trouble candidates on the display device on a basis of the input, the control device displays one or more phenomena associated with a selected trouble candidate on a basis of selection of any one of the plurality of trouble candidates, and the control device displays one or more causes associated with the selected phenomenon on the display device on a basis of selection of any one of the one or more phenomena.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
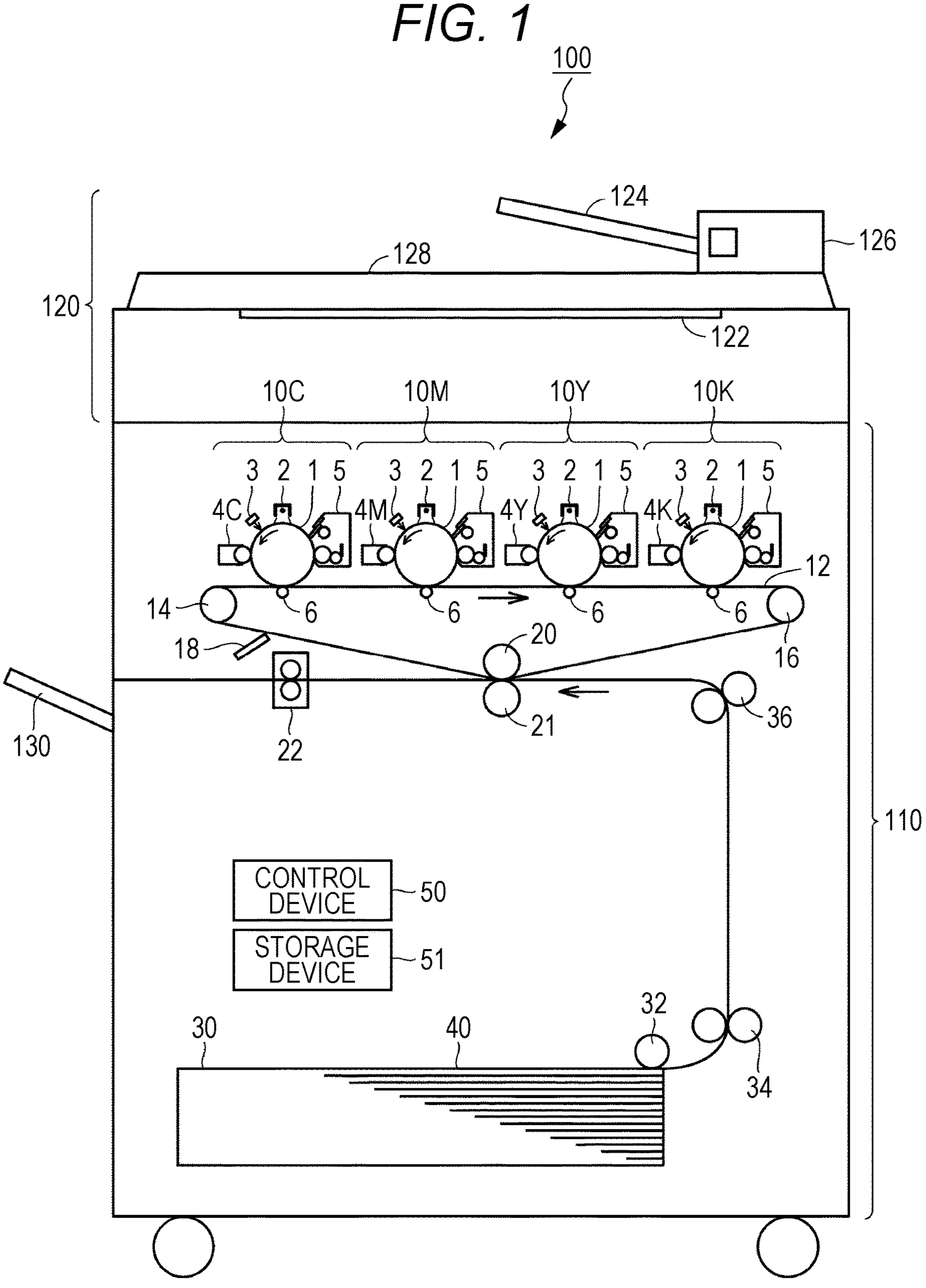
FIG. 1 is a diagram illustrating a configuration example of an image forming device according to a first embodiment.

Hereinafter, one or more embodiments of the present invention will be described with reference to the drawings. However, the scope of the invention is not limited to the disclosed embodiments. In the following description, the same components are denoted by the same reference numerals. Their names and functions are the same. Accordingly, detailed description thereof will not be repeated.

The image forming device disclosed in this specification displays an inquiry screen regarding an occurring trouble. When the user inputs information in the inquiry screen, the image forming device narrows down the cause of the trouble on the basis of the inputted information and displays the cause on the inquiry screen. In one aspect, the image forming device repeats narrowing down the trouble and displaying the cause, and identifies a trouble occurring in the image forming device. The image forming device eliminates or mitigates the trouble by changing an image formation condition and other driving conditions of the image forming device. Moreover, in a case where the image forming device changes the driving conditions, the user can select the driving conditions according to the preference of change in the image output quality.

As a result, even a user who is unfamiliar with the technique of the image forming device can easily identify causes of various problems. Moreover, the user can quickly take measures against a malfunction of the image forming device. Furthermore, even in a case where the driving conditions are changed, each user can operate the image forming device with setting of output with image quality matching his/her own preference.

First Embodiment

A configuration of an image forming device 100 according to the present embodiment will be described with reference to FIGS. 1 and 2. FIG. 1 is a diagram illustrating a configuration example of the image forming device 100 according to the present embodiment.

Hereinafter, the image forming device 100 mounted as a multi-function peripheral (MFP) will be described as an example. Although the image forming device 100 is, for example, a color image forming device, the application target of the technical idea according to the present embodiment is not limited to a color image forming device, and the technical idea can also be applied to a monochrome image forming device. Furthermore, by installing a computer program for realizing the technical idea in a mobile terminal, a tablet terminal, or another information processing terminal, or a server provided on a cloud, the technical idea can also be applied to the mobile terminal, the tablet terminal, the another information processing terminal, or the server.

The image forming device 100 includes a print engine 110, an original reading unit 120, and a delivery tray 130. The print engine 110 includes imaging units 10C, 10M, 10Y, and 10K (which will also be hereinafter referred to as "imaging units 10" collectively) that respectively generate toner images of cyan (C), magenta (M), yellow (Y), and key plate (K), an intermediate transfer belt 12, intermediate transfer body driving rollers 14 and 16, a belt cleaning unit 18, transfer rollers 20 and 21, a fixing unit 22, a paper feeder 30, a delivery roller 32, conveyance rollers 34 and 36, a control device 50, and a storage device 51. Each imaging unit 10 includes a photoreceptor 1, a charging unit 2, an exposure unit 3, a developing unit 4 (which is described as each of 4C, 4M, 4Y, and 4K in correspondence with the color of the toner image generated by a corresponding imaging unit 10), a cleaning unit 5, and an intermediate transfer body contact roller 6. The original reading unit 120 includes an image scanner 122, an original feeding table 124, an automatic original feeder 126, and an original delivery table 128.

The print engine 110 performs printing on a medium 40 placed in the paper feeder 30. The medium 40 is conveyed from the paper feeder 30 by the delivery roller 32. Furthermore, the medium 40 is conveyed to the transfer rollers 20 and 21 by the conveyance rollers 34 and 36. When the transfer rollers 20 and 21 transfer a toner image onto the medium 40, the fixing unit 22 executes a fixing process. The medium 40 is discharged to the delivery tray 130.

Each imaging unit 10 and the intermediate transfer belt 12 generate a toner image to be transferred to the medium 40. Each charging unit 2 uniformly charges the surface of a photoreceptor 1 which is an image carrier. Each exposure unit 3 forms an electrostatic latent image on the surface of a photoreceptor 1 by exposing the surface of the photoreceptor 1 according to a designated image pattern by laser writing or the like. Each developing unit 4 develops an electrostatic latent image formed on a photoreceptor 1 as a toner image.

A toner image formed on the surface of each photoreceptor 1 is transferred to the intermediate transfer belt 12 by an intermediate transfer body contact roller 6. Toner images from the photoreceptors 1 are sequentially transferred onto the intermediate transfer belt 12, so that the toner images of four colors are superimposed. The superimposed toner images are transferred from the intermediate transfer belt 12 to the medium 40 by the transfer rollers 20 and 21.

After the transfer of a toner image from a photoreceptor 1 to the intermediate transfer belt 12, that is, after secondary transfer, each cleaning unit 5 removes toner and external additives remaining on the surface of a photoreceptor 1 in order to clean the photoreceptor 1. The cleaning unit 5 removes the toner and the external additive on the surface of the photoreceptor 1 by a stationary layer formed by toner staying between the cleaning unit 5 and the photoreceptor 1. The stationary layer not only cleans the surface of the photoreceptor 1 but also reduces friction between the cleaning unit 5 and the photoreceptor 1 to protect the cleaning unit 5 and the photoreceptor 1.

The original reading unit 120 reads an original. The original reading unit 120 outputs the result of reading as an input image to the print engine 110. The image scanner 122 scans an original placed on a platen glass. The automatic original feeder 126 continuously feeds originals placed on the original feeding table 124. Originals placed on the original feeding table 124 are fed one by one by a delivery roller (not illustrated). The fed originals are sequentially scanned by the image scanner 122 or by an image sensor disposed in the automatic original feeder 126. Then, the originals are discharged to the original delivery table 128.

The control device 50 controls the operation of the image forming device 100. The storage device 51 holds firmware and other programs of the image forming device 100, and various settings and other data. The data includes a model number and a serial number of the image forming device 100, and other data for identifying the image forming device. The control device 50 refers to necessary data and programs in the storage device 51.

Figure 2:
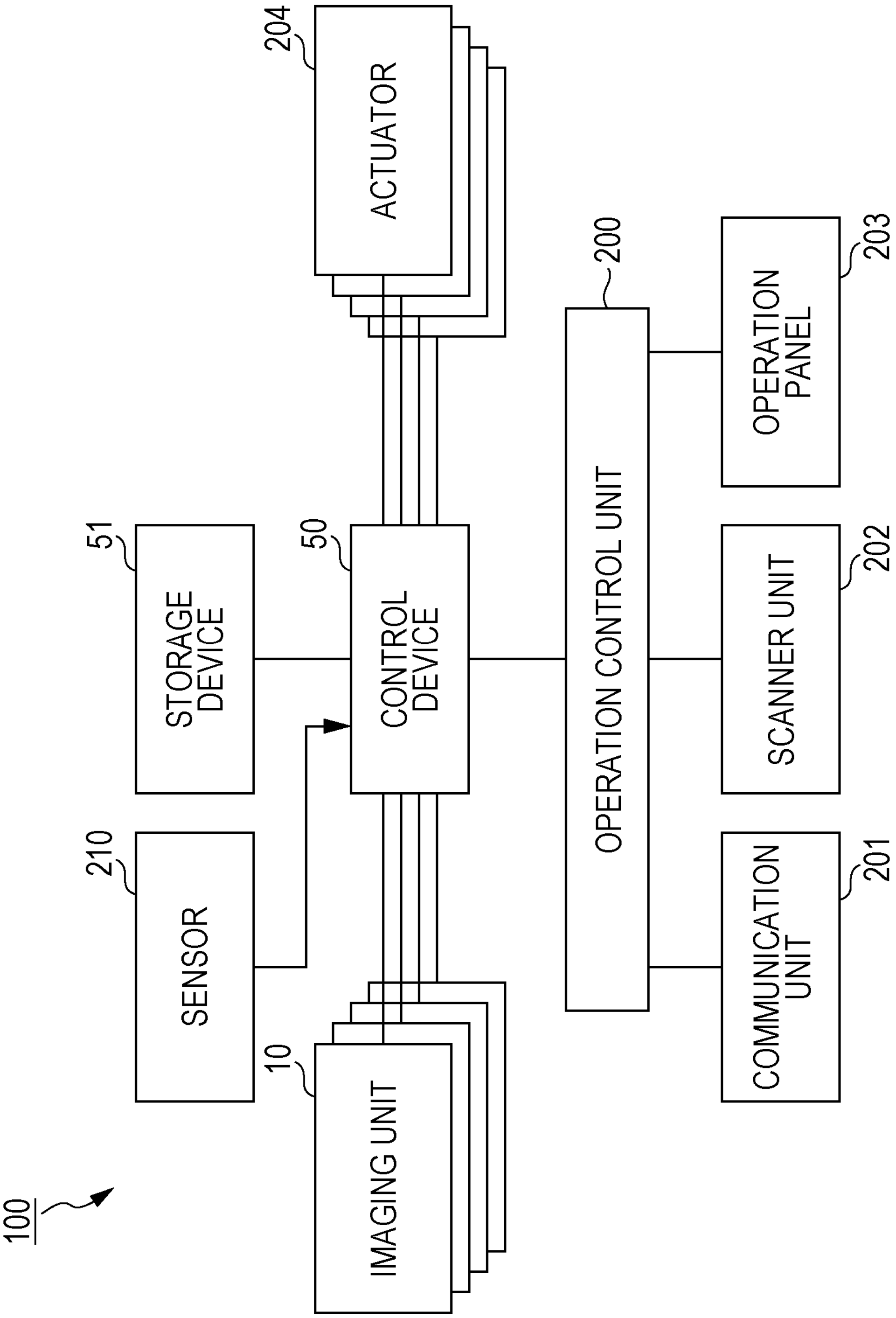
FIG. 2 is a diagram illustrating an example of a circuit configuration of a part of the image forming device.

FIG. 2 is a diagram illustrating an example of a circuit configuration of a part of the image forming device 100. As illustrated in FIG. 2, the control device 50 is electrically connected with the storage device 51, each imaging unit 10, a plurality of actuators 204, an operation control unit 200, and a sensor 210. The operation control unit 200 is electrically connected with a communication unit 201, a scanner unit 202, and an operation panel 203.

The communication unit 201 receives an image and a print job from a terminal such as an external computer. Moreover, the communication unit 201 transmits data to the terminal. The data to be transmitted may include data obtained after image formation, data indicating the state of the image forming device 100, a message for requesting maintenance of the image forming device 100, and the like. The message may be either a text or a voice. The communication unit 201 is realized by a telephone function or an electronic mail function in one aspect.

The scanner unit 202 scans an original fed to the original reading unit 120 and acquires image data corresponding to the original.

The operation panel 203 accepts an input from a touch panel or a button (not illustrated) provided on a housing of the image forming device 100. The operation panel 203 displays information on a monitor (not illustrated) provided on the housing of the image forming device 100 as an output device. The information to be displayed includes information indicating the content of a print instruction given by a user of the image forming device 100, and information indicating the state of the image forming device 100 at the time of abnormality.

The operation control unit 200 transmits a print instruction to the control device 50 on the basis of image data or a print job received from any one of the communication unit 201, the scanner unit 202, and the operation panel 203. Moreover, the operation control unit 200 transmits a dot count, image data, and the like to the control device 50.

The control device 50 forms an image on the basis of the image data and prints the image on the medium by controlling each actuator 204 on the basis of the reception of the print instruction from the operation control unit 200. The control device 50 can acquire necessary data and programs from the storage device 51 or a memory built in the control device 50.

Each actuator 204 may be, for example, a motor for driving an imaging unit 10 and various rollers, a halogen heater of the fixing unit 46, or an arbitrary actuator of the charging unit 2, the exposure unit 3, the developing unit 4, or the like.

[Screen Transition]

Figure 3A:
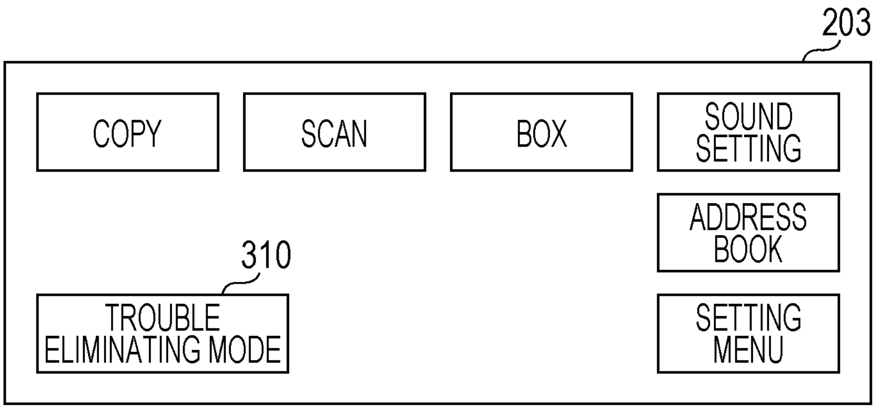
FIGS. 3A to 3C are diagrams illustrating transition of a screen in an operation panel according to the first embodiment.
Figure 3B:
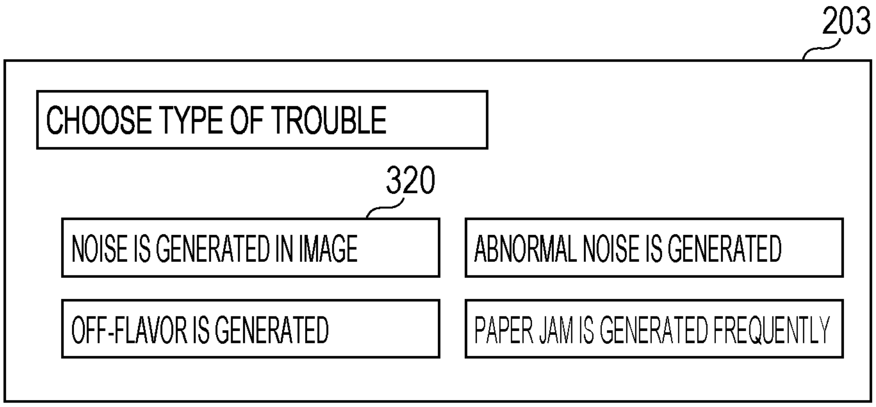
Figure 3C:
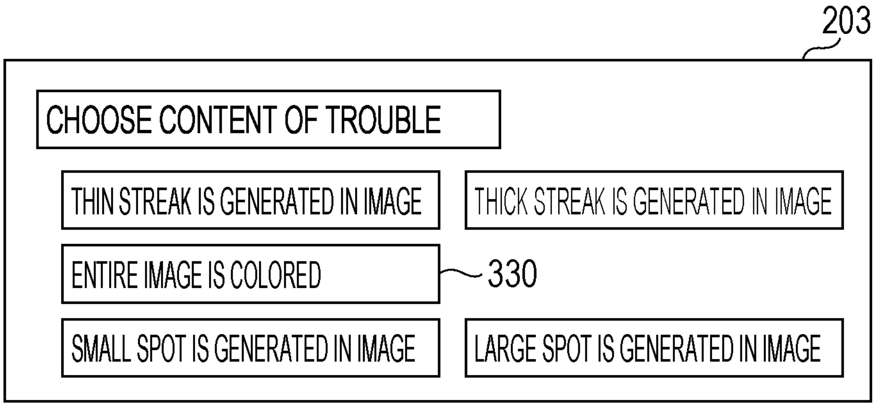

Screen transition of the image forming device 100 will be described with reference to FIGS. 3A to 3C. FIGS. 3A to 3C are diagrams illustrating transition of a screen on the operation panel 203 according to the first embodiment.

The screen of FIG. 3A is a diagram illustrating an example of a default menu of the operation panel 203 in a state where the image forming device 100 is in a standby state capable of accepting an operation.

The operation panel 203 is realized as a touch panel. The operation panel 203 displays an icon 310 in addition to icons for accepting normal processes executed by the image forming device 100. The icon 310 accepts a command to switch the operating mode of the image forming device 100 from a normal mode to a trouble eliminating mode.

In one aspect, the user may recognize a quality abnormality or an operation abnormality of the image forming device 100. For example, the user can recognize a printing abnormality in a printed medium (paper), abnormal noise during operation of the image forming device 100, or the like. In such a case, when the user presses the icon 310, the control device 50 switches the operating mode of the image forming device 100 from the normal operation mode to the trouble eliminating mode. Furthermore, the control device 50 switches the screen of the operation panel 203 from the screen of FIG. 3A to the screen of FIG. 3B.

The screen of FIG. 3B asks the user of the image forming device 100 about the type of the trouble. In one aspect, the control device 50 displays icons for accepting selection of one or more types of trouble assumed in advance on the operation panel 203. When the user selects an icon 320 as the type of the trouble, the control device 50 switches the screen of the operation panel 203 from the screen of FIG. 3B to the screen of FIG. 3C.

The screen of FIG. 3C asks the user of the image forming device 100 about the content of the trouble. In one aspect, the operation panel 203 displays icons for accepting selection of one or more contents of the trouble assumed in advance. In a case where the printed paper is colored, the user can select an icon 330 as the type of the trouble.

In this way, the user can narrow down the cause of the trouble.

Second Embodiment

A second embodiment will be described with reference to FIGS. 4 to 8D. An image forming device according to the present embodiment is different from the image forming device according to the above-described embodiment in that it has a function of repeating the operation of narrowing down the trouble. Note that the hardware configuration of the image forming device according to the present embodiment is the same as the hardware configuration of the image forming device 100 according to the above-described embodiment. Accordingly, the description of the hardware configuration will not be repeated.

[Functional Configuration]

Figure 4:
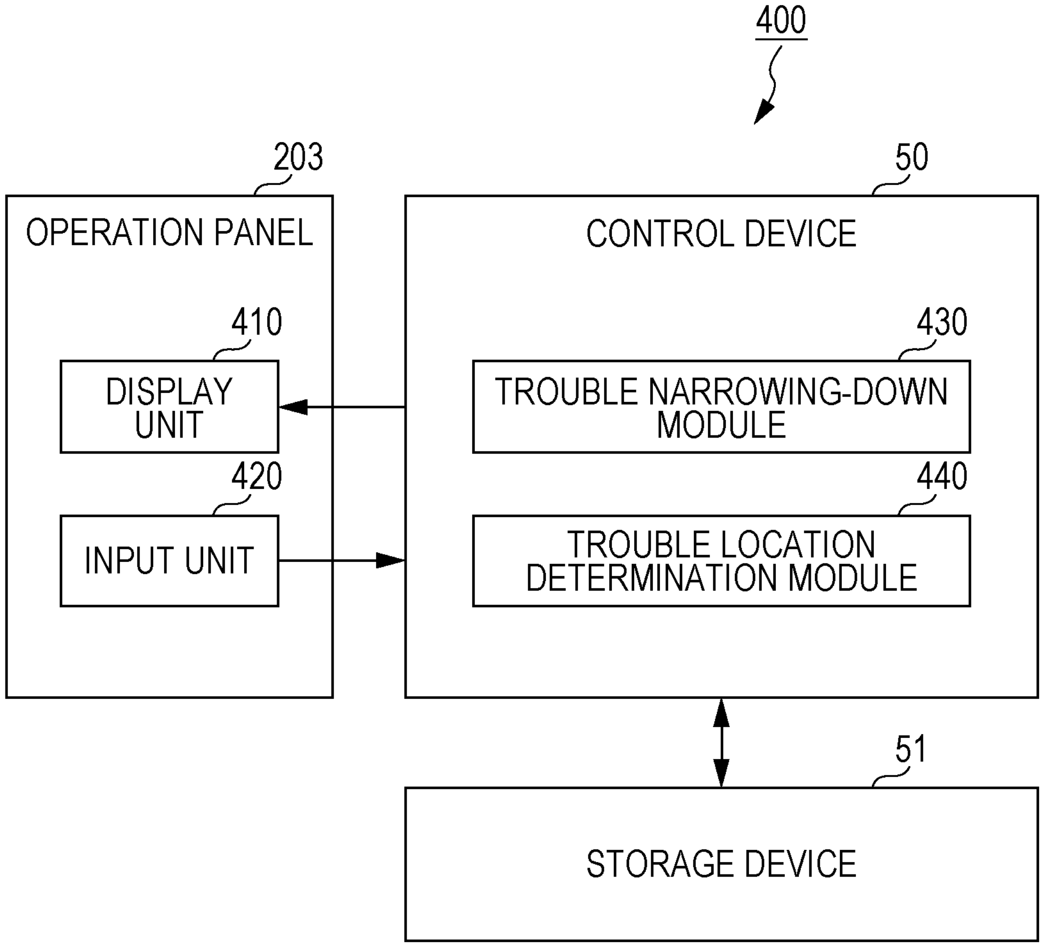
FIG. 4 is a block diagram illustrating a configuration of a part of an image forming device according to a second embodiment.

An example of a configuration of an image forming device 400 according to the present embodiment will be described with reference to FIG. 4. FIG. 4 is a block diagram illustrating a configuration of a part of the image forming device 400 according to the second embodiment.

The image forming device 400 includes an operation panel 203, a control device 50, and a storage device 51. The operation panel 203 includes a display unit 410 and an input unit 420. The control device 50 includes a trouble narrowing-down module 430 and a trouble location determination module 440.

The display unit 410 includes a liquid crystal monitor, an organic electro luminescence (EL) monitor, or the like. The input unit 420 includes a touch panel, a physical switch, or the like.

The trouble narrowing-down module 430 narrows down candidates of a trouble occurring in the image forming device 400 on the basis of an input (selection operation) by the user. Details of the narrowing-down processing will be described later.

The trouble location determination module 440 identifies a trouble occurring in the image forming device 400 on the basis of an input by the user.

The storage device 51 holds a program for controlling the operation of the image forming device 400, an image formation condition set by the user of the image forming device 400, and other data.

[Data Structure]

Figure 5:
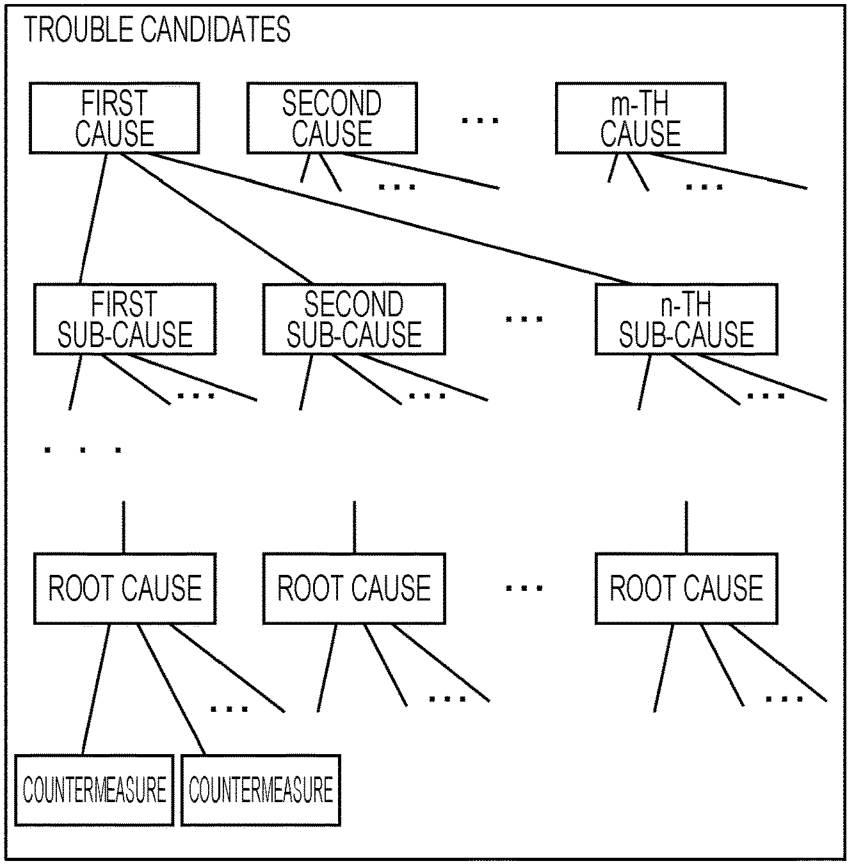
FIG. 5 is a diagram conceptually illustrating an aspect of data storage in a storage device provided in the image forming device according to the second embodiment.

A data structure of the image forming device 400 will be described with reference to FIG. 5. FIG. 5 is a diagram conceptually illustrating an aspect of data storage in the storage device 51 provided in the image forming device 400 according to the second embodiment. The storage device 51 holds a tree 510 and tables 520 and 530.

The tree 510 holds a logic tree related to a trouble candidate. In the present embodiment, a trouble candidate refers to one or a plurality of abnormalities (troubles) assumed to occur in the image forming device 100. The tree 510 includes detailed data of trouble candidates. The tree 510 is data in a tree format of cause analysis. Note that the format for holding the trouble candidate data is not limited to the tree format.

More specifically, a trouble candidate includes one or more causes. A cause may be divided into one or more sub-causes. Another cause may be divided into one or more root causes. A sub-cause may be further divided into one or more causes. Another sub-cause may be divided into root causes. Each root cause is associated with one or more countermeasures.

The table 520 includes the content of an image formation condition set by the user of the image forming device 400. Even in a case where the image formation condition is changed, the user can easily set a desired image formation condition by reading the image formation condition held in the table 520. Moreover, the image formation condition can be transmitted to another image forming device having the same specifications as the specifications of the image forming device 400. As a result, the another image forming device can also operate under the same image formation condition. For example, in a case where a plurality of image forming devices having the same specifications are connected with an intra-network, the image forming devices each can print an image on a medium under the same image formation condition.

The table 530 holds an order of preferred change in image quality for each user of the image forming device 400. The preference of image quality differs for each user. The image forming device 100 according to the present embodiment can hold the preference of image quality selected by each user.

[Control Structure]

Figure 6:
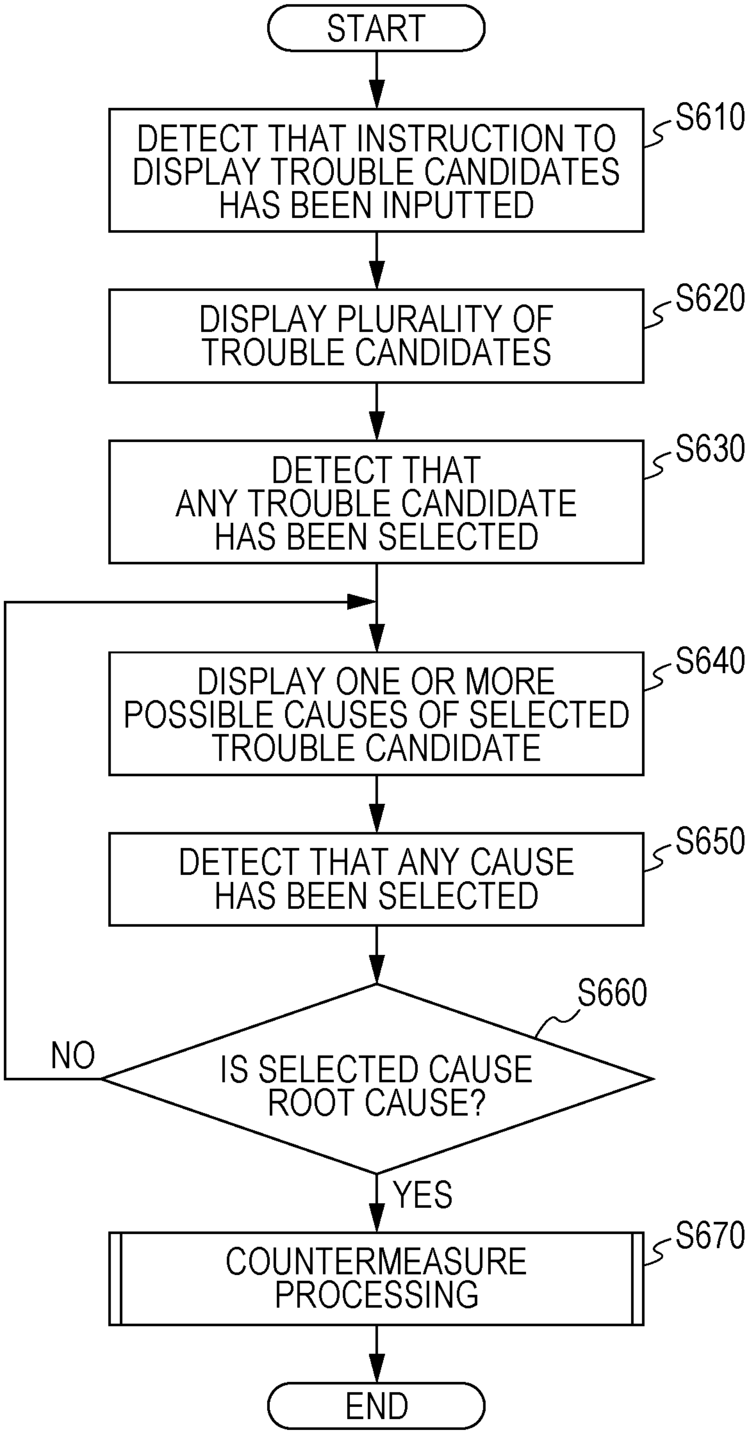
FIG. 6 is a flowchart (part 1) illustrating a part of processing executed by a control device of the image forming device according to the second embodiment.
Figure 7:
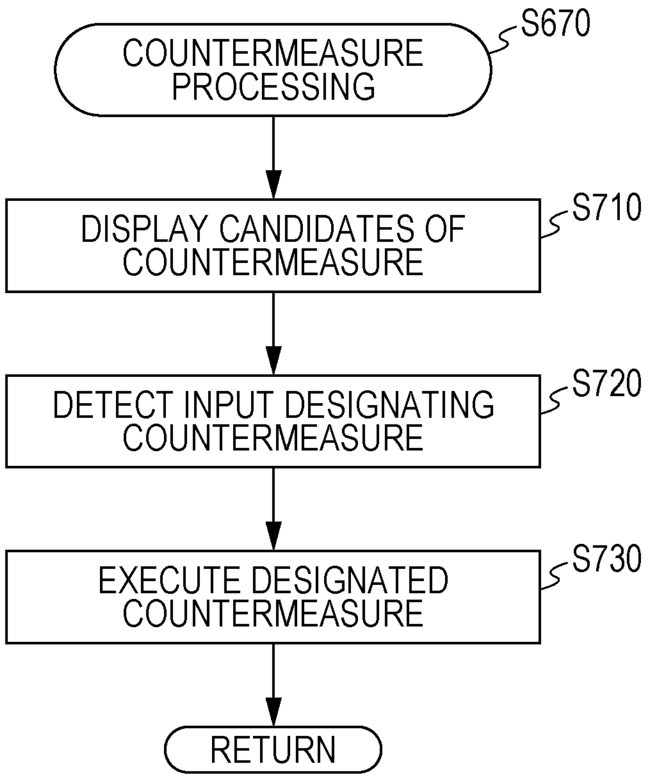
FIG. 7 is a flowchart (part 2) illustrating a part of processing executed by the control device of the image forming device according to the second embodiment.

A control structure of the image forming device 400 will be described with reference to FIGS. 6 and 7. FIGS. 6 and 7 are flowcharts illustrating a part of processing executed by the control device 50 of the image forming device 400 according to the second embodiment.

In step S610, the control device 50 detects that an instruction to display trouble candidates has been inputted on the basis of an input to the operation panel 203.

In step S620, the control device 50 displays a plurality of trouble candidates on a monitor (not illustrated) on the basis of data (tree 510) stored in the storage device 51.

In step S630, the control device 50 detects that any trouble candidate has been selected by the user on the basis of an input to the operation panel 203. For example, when the user selects any icon displayed on the monitor, a trouble candidate associated with the icon is selected.

In step S640, the control device 50 displays one or more possible causes of the selected trouble candidate on the monitor on the basis of the data (tree 510) stored in the storage device 51.

In step S650, the control device 50 detects that any cause has been selected from the one or more causes on the basis of an input to the operation panel 203. Also in this case, for example, when the user selects any icon displayed on the monitor, a cause associated with the icon is selected.

In step S660, the control device 50 determines whether the selected cause is a root cause or not. This determination is made on the basis of whether the attribute associated with each node constituting the tree 510 is a root cause or not. When determining that the selected cause is a root cause (YES in step S660), the control device 50 switches the control to step S670. Otherwise (NO in step S660), the control device 50 returns the control to step S640.

In step S670, the control device 50 executes countermeasure processing to be described later. The countermeasure processing is associated with the root cause.

Referring to FIG. 7, the control device 50 executes the countermeasure processing (step S670). First, in step S710, the control device 50 displays candidates of the countermeasure on the monitor. In step S720, the control device 50 detects an input designating any countermeasure among the countermeasure candidates on the basis of an input to the operation panel 203. For example, any one of the countermeasures is selected when the user touches an icon on which the countermeasure is displayed.

In step S730, the control device 50 executes the designated countermeasure. As an example, the countermeasure may include changing the operation mode of the image forming device 100 to the confirmation mode, displaying a predefined guidance menu on a monitor, notifying contact information registered in advance, and the like. The notification to the contact information includes e-mail transmission, facsimile transmission, or telephone call.

[Display Mode]

A display mode of the screen will be described with reference to FIGS. 8A to 8D. FIGS. 8A to 8D are diagrams illustrating change in a monitor screen shown in a display area of the operation panel 203.

Figure 8A:
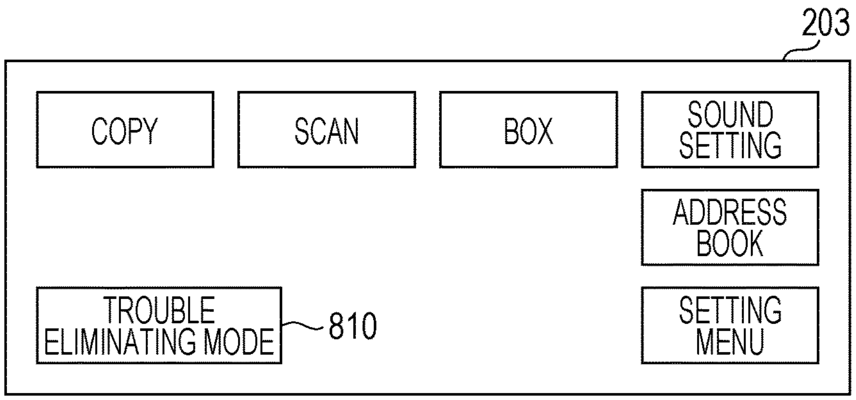
FIGS. 8A to 8D are diagrams illustrating change in a monitor screen shown in a display area of the operation panel.

The screen of FIG. 8A illustrates an initial state of the monitor screen. The operation panel 203 displays an icon 810 for accepting an instruction to start the trouble eliminating mode in addition to a normal operation menu (copy, scan, etc.). In one aspect, when the user touches the icon 810, the control device 50 displays the screen of FIG. 8B on the operation panel 203.

Figure 8B:
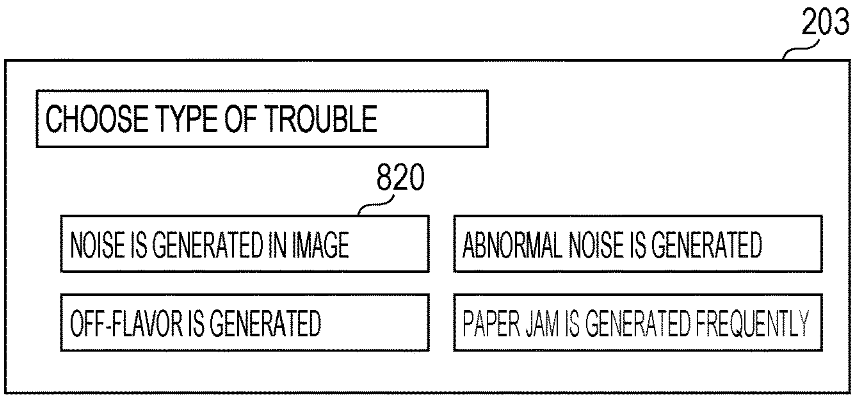

The screen of FIG. 8B is a screen asking the user about the type of the trouble. The screen of FIG. 8B displays icons of trouble candidates assumed in advance. In a case where the number of trouble candidates is large, the screen of FIG. 8B displays other trouble candidates on the next screen in response to an input of an instruction to switch the screen. In one aspect, when the user touches the icon 820, the control device 50 displays the screen of FIG. 8C on the operation panel 203.

Figure 8C:
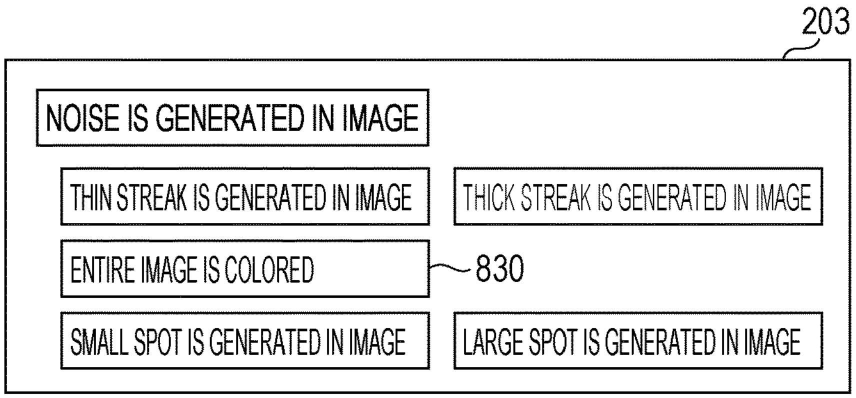

The screen of FIG. 8C is a screen asking the user about the cause of the trouble that "noise is generated in the image" selected by the user. The screen of FIG. 8C displays one or more causes of the selected trouble according to a data structure prepared in advance as in the tree 510 (FIG. 5). In a case where the number of causes is large, the screen of FIG. 8C displays other trouble candidates on the next screen in response to an input of an instruction to switch the screen. In one aspect, when the user touches the icon 830, the control device 50 displays the screen of FIG. 8D on the operation panel 203.

Figure 8D:
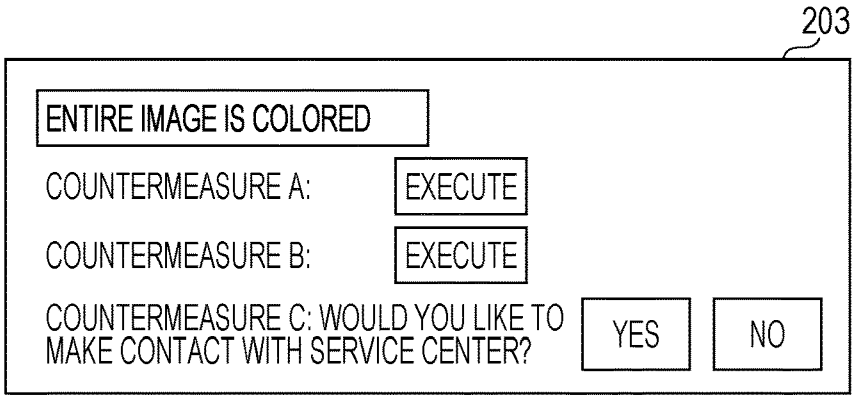

The screen of FIG. 8D is a screen showing countermeasures against the cause that "the entire image is colored" selected by the user. The screen of FIG. 8D displays one or more countermeasures associated with the cause (root cause) identified finally. The user can select one or more icons. A countermeasure associated with the selected icon is executed. The countermeasure to be executed may include changing the image formation condition to the condition of a test mode and performing test printing, operating only the driving system designated in advance, and the like.

Third Embodiment

Figure 9:
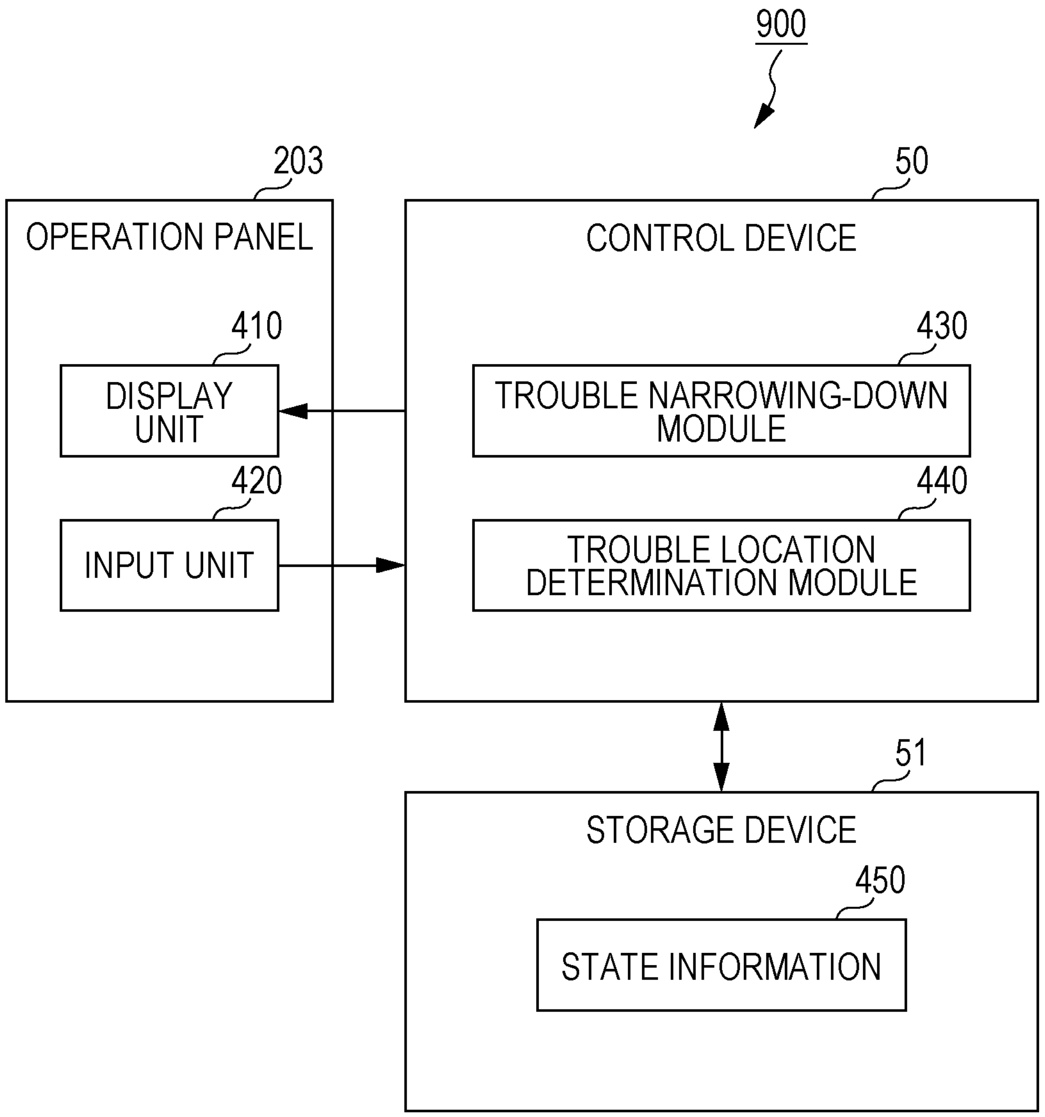
FIG. 9 is a diagram illustrating a part of a configuration of an image forming device according to a third embodiment.

A third embodiment will be described with reference to FIG. 9. FIG. 9 is a diagram illustrating a part of a configuration of an image forming device 900 according to the third embodiment.

The image forming device 900 according to the present embodiment is different from the image forming device 100 according to the above-described embodiment in that it has a function of determining a trouble location by utilizing its own state information. The hardware of the image forming device 900 according to the present embodiment is the same as the hardware configuration of the image forming device 100 described above. Accordingly, the description of the hardware configuration will not be repeated.

As illustrated in FIG. 9, the image forming device 900 holds state information 450 in a storage device 51 in addition to the configuration of the image forming device 400 illustrated in FIG. 4. In one aspect, a control device 50 of the image forming device 900 accesses the storage device 51 and reads the state information 450.

The state information 450 is a disturbance such as temperature and humidity of the inside of the image forming device 900, a use amount of the developing unit, the fixing unit, the image carrier holding unit, and the paper feeding unit constituting the image forming device 900, or an internal disturbance such as a size of a gap formed between the image carrier and the developing unit, and toner concentration. As a result, for example, a trouble location determination module 440 can determine a trouble that fogging is occurring in a case where the trouble information selected by the user is that "the entire image is colored", and "the humidity of the image forming device 900 is high" or "the toner concentration is high" as the state information 450 of the image forming device 900.

Fourth Embodiment

Hereinafter, a fourth embodiment will be described. An image forming device according to the present embodiment is realized using the configurations of the image forming devices 100 and 400 described above. Accordingly, the description of the hardware configuration of the image forming device according to the present embodiment will not be repeated. Moreover, the image forming device according to the present embodiment will be described using the configurations of the image forming devices according to the first to third embodiments as appropriate.

The image forming device according to the present embodiment changes an image formation condition on the basis of a result of determining a trouble by the trouble location determination module 440 of the image forming device 900 according to the third embodiment. Since the image forming device 900 operates under a changed image formation condition, the trouble can be eliminated, and the recurrence can be prevented. For example, the trouble location determination module 440 determines a trouble that fogging is occurring. In this case, the control device 50 lowers the toner concentration in order to change the image formation condition. As a result, the occurrence of fogging is eliminated.

Fifth Embodiment

Hereinafter, a fifth embodiment will be described. An image forming device according to the present embodiment is realized using the configuration of the image forming device 900 described above. Accordingly, the description of the hardware configuration of the image forming device according to the present embodiment will not be repeated. Moreover, the image forming device according to the present embodiment will be described using the configurations of the image forming devices according to the first to third embodiments as appropriate.

In one aspect, when an image formation condition is changed, output quality may change. The change may be change not desired by the user. Therefore, the image forming device according to the present embodiment displays a plurality of examples of change in the output quality. The user can select a preferred example from the plurality of displayed examples. As a result, when the image forming device changes the image formation condition and this causes a side effect, the user can avoid an undesirable change.

For example, the control device 50 may detect that so-called fogging is occurring as the trouble location determination module 440. In this case, a method of lowering the toner concentration is effective in order to eliminate the fogging. However, when the toner concentration is lowered, a side effect that the image density slightly lowers occurs.

Moreover, as another method for eliminating the fogging, it is also effective to increase the toner stirring time of toner in the developing unit before image formation. However, when the stirring time becomes longer, there arises a side effect that the required time from when the user gives an instruction for image formation to the image forming device to when a medium (paper) on which an image is formed is outputted becomes longer.

The image forming device according to the present embodiment displays a plurality of examples obtained by changing the image quality according to the change in the image formation condition, and the user can select any one of the examples. As a result, the user can eliminate the trouble while maintaining the image formation condition reflecting his/her preference and avoiding the side effect described above.

Sixth Embodiment

Hereinafter, a sixth embodiment will be described. An image forming device according to the present embodiment is different from the image forming device according to the above-described embodiment in that it has a function of returning an image formation condition to an original value in a case where an image forming unit is replaced.

Note that the image forming device according to the present embodiment is realized using the configuration of the image forming device 900 described above. Accordingly, the description of the hardware configuration of the image forming device according to the present embodiment will not be repeated. Moreover, the image forming device according to the present embodiment will be described using the configurations of the image forming devices according to the first to third embodiments as appropriate.

In one aspect, an image forming unit constituting the image forming device may be replaced due to a malfunction or the lifetime. The image formation condition of the image forming device may be changed before the image forming unit is replaced. Therefore, when the image forming unit is changed, the image forming device according to the present embodiment returns the image formation condition to an image formation condition used before change (or an initial image formation condition). As a result, in a case where a new image forming unit is attached to the image forming device, the image forming device can form an image under the original image formation condition.

For example, in one aspect, the control device 50 may determine that fogging is occurring. In this case, the control device 50 may change the image formation condition so that the toner concentration lowers. One of the causes of occurrence of fogging is a small size of a gap formed between the image carrier and the developing unit of the image forming device. In such a case, when the image forming unit is replaced with an image forming unit in which a large gap is formed between the image carrier and the developing unit, a trouble that the density of the formed image lowers may occur.

Therefore, in a case where the image forming unit is replaced, the control device 50 changes the image formation condition to an image formation condition corresponding to the replaced image forming unit as a condition changing module. That is, the image forming device returns the image formation condition that has been changed to an image formation condition used before change. As a result, it is possible to avoid occurrence of a trouble that the density of the image lowers. Note that the image forming unit may include means such as an image carrier holding unit, a fixing unit, or a paper feeding unit in addition to the developing unit.

As described above, the image forming device according to the present embodiment returns the image formation condition to an image formation condition used before change or to an initial image formation condition in a case where the image forming unit is replaced. As a result, it is possible to prevent a trouble from being caused by changing the image formation condition.

Seventh Embodiment

Figure 10:
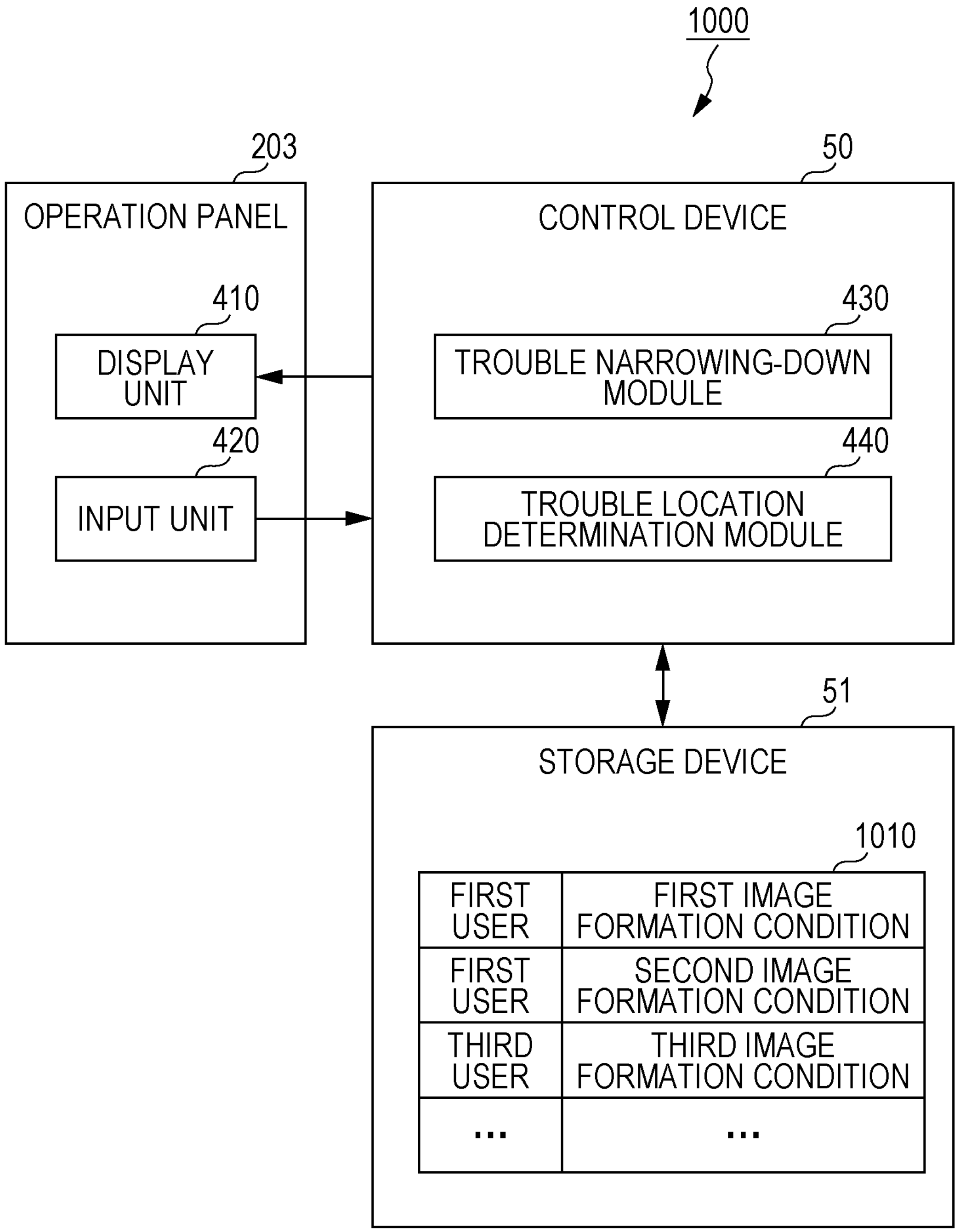
FIG. 10 is a diagram schematically illustrating a part of a configuration of an image forming device according to a seventh embodiment.

A seventh embodiment will be described with reference to FIG. 10. FIG. 10 is a diagram schematically illustrating a part of a configuration of an image forming device 1000 according to the seventh embodiment. The image forming device 1000 according to the present embodiment is different from image forming devices according to the above-described embodiments in that is has a function of holding an image formation condition for each user.

Note that the hardware configuration of the image forming device 1000 according to the present embodiment is the same as the hardware configuration of the image forming device 100 according to the first embodiment. Accordingly, the description of the hardware configuration of the image forming device 1000 according to the present embodiment will not be repeated.

As illustrated in FIG. 10, the image forming device 1000 stores a table 1010 in a storage device 51. The table 1010 stores identification information of one or more users registered as users of the image forming device 1000. The identification information is associated with an image formation condition set by the user. Accordingly, a control device 50 can form an image according to an image formation condition unique to each registered user.

Moreover, the storage device 51 saves information including preferred image output quality inputted by the user. The control device 50 analyzes information inputted by the user. For example, the control device 50 stores setting selected by each user of the image forming device 1000 in the storage device 51. The control device 50 reads the content of each setting from the storage device 51 and extracts frequently selected setting, last selected setting, or the like as an analysis result. The control device 50 generates a sample image showing change in quality of each of the plurality of images displayed on a display unit 410 according to the analysis result and changes a display order of generated sample images.

Since users of the image forming device have different values and situations, changes in output quality may also have different values and situations similarly. For example, in a case where fogging occurs, a user who does not select lowering the image density may want to prioritize the image quality even if the image output time may be long.

As an example, another trouble may be that opposing positions in the circumferential direction are exposed to different humidity environments while the image carrier is at a stop. For example, the humidity at an opposing position of the cleaning unit may be higher than the humidity at other positions. In this case, the Vi attenuation sensitivity of the image carrier with respect to light is different for each opposing position of the image carrier, and unevenness in image density occurs. In this case, the image forming device 1000 slightly rotates the image carrier even while no image is being formed. As a result, unevenness in humidity caused by exposure of the image carrier in the circumferential direction is reduced, and therefore, unevenness in image density is also reduced.

Therefore, in a case where such a trouble occurs, the image forming device 1000 changes the display order of sample images displayed on the display unit 410 to, for example, an order of first displaying a sample image that is recommended to prioritize image quality. Since the user can quickly select the image formation condition corresponding to the sample image, the labor for eliminating the trouble can be reduced.

Eighth Embodiment

Figure 11:
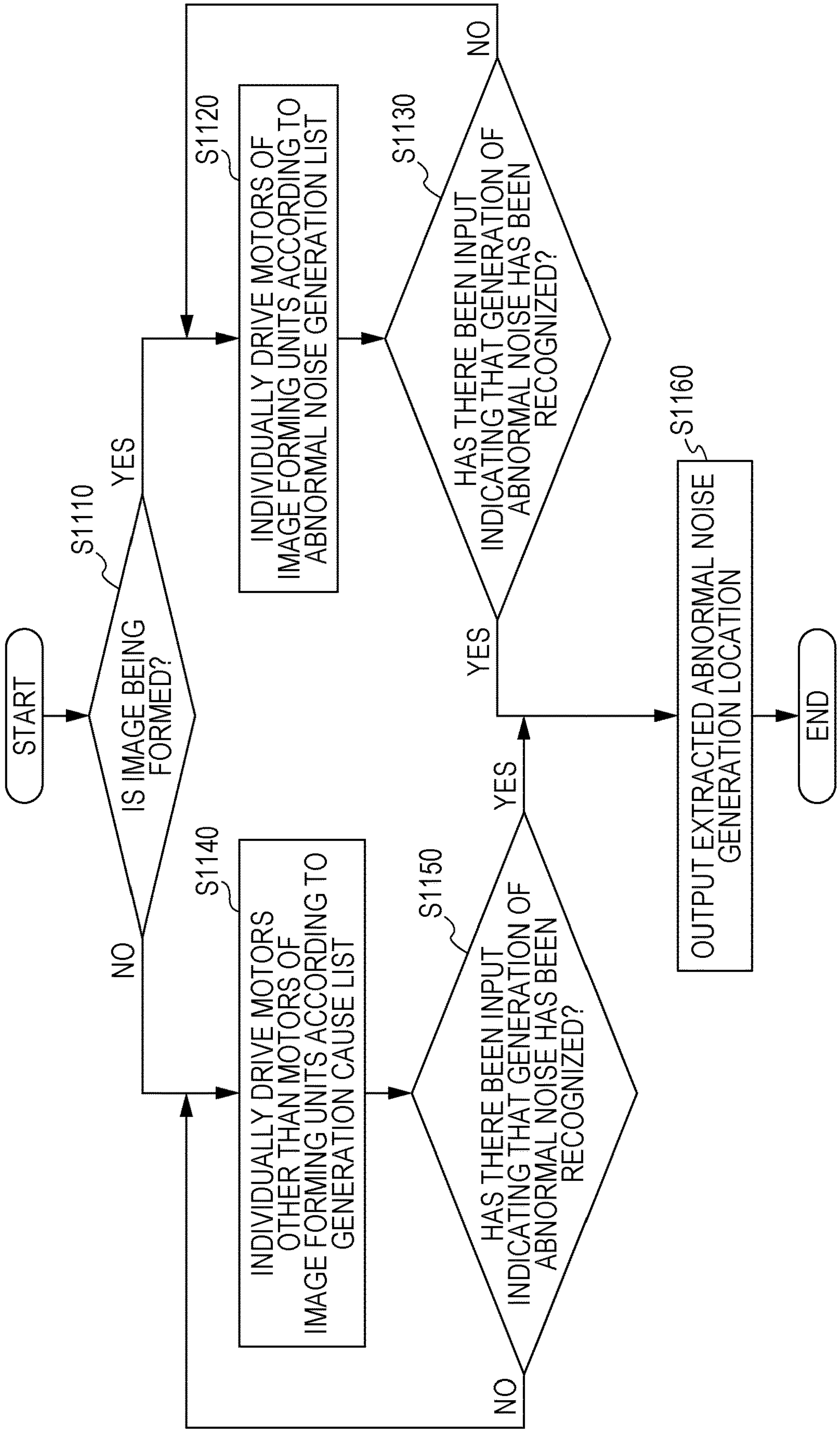
FIG. 11 is a flowchart illustrating a part of processing executed by an image forming device according to an eighth embodiment for abnormal noise determination.

An eighth embodiment will be described with reference to FIG. 11. The image forming device according to the present embodiment is different from the image forming devices according to the above-described embodiments in that it has a function of identifying a cause in a case where abnormal noise is generated.

Note that the hardware configuration of the image forming device according to the present embodiment is the same as the hardware configuration of the image forming device 100 according to the first embodiment. Accordingly, the description of the hardware configuration of the image forming device according to the present embodiment will not be repeated.

The control device 50 determines a trouble location of the image forming device 100 on the basis of trouble information selected by the user. At the time of image formation, almost all the units of the image forming device operate. Therefore, in a case where the trouble is abnormal noise, the source of the noise is unclear.

Therefore, the image forming device according to the present embodiment operates driving units of the image forming device according to a predetermined driving order, and accepts an input indicating whether abnormal noise is being generated in the driving unit or not. In a case where the user inputs, to the image forming device, that abnormal noise is not being generated from a driving unit, the image forming device operates another driving unit according to the predetermined driving order. By such repetition, the user can identify the source of the abnormal noise.

For example, in a case where it is estimated that the abnormal noise is being generated from the fixing unit, the user inputs the fact to the image forming device. The image forming device operates only the fixing unit without operating other driving units constituting the image forming unit. Each driving unit includes a motor and an actuator. While the fixing unit is operating, the image forming device accepts an input indicating a determination result as to whether abnormal noise is being generated or not from the user. When determining that the abnormal noise is being generated from the fixing unit, the user inputs the determination result to the image forming device. On the other hand, when determining that the abnormal noise is not being generated from the fixing unit, the user inputs the determination result to the image forming device. The image forming device operates driving units other than the driving unit of the fixing unit according to a predetermined driving order. In this manner, the image forming device can identify the trouble location on the basis of the abnormal noise.

A control structure of the image forming device according to the present embodiment will be described with reference to FIG. 11. FIG. 11 is a flowchart illustrating a part of processing executed by the image forming device according to the eighth embodiment for abnormal noise determination.

In step S1110, the control device 50 determines whether the image forming device 100 is forming an image or not. This determination is made on the basis of, for example, whether the image forming device 100 has received a command (job) instructing image formation or not. When determining that the image forming device 100 is forming an image (YES in step S1110), the control device 50 switches the control to step S1120. Otherwise (NO in step S1110), the control device 50 switches the control to step S1140.

In step S1120, the control device 50 individually drives motors of the imaging unit 10, the actuator 204, and other image forming units according to the abnormal noise generation list. The abnormal noise generation list is created in advance by a manufacturer of the image forming device 100. In another aspect, the abnormal noise generation list may be created by a manager of the image forming device 100. The operation panel 203 displays a message prompting an input indicating that generation of abnormal noise has been confirmed.

In step S1130, the control device 50 determines whether there has been an input indicating that generation of abnormal noise has been confirmed or not. This determination is made on the basis of whether the operation panel 203 has received an input or not. When determining that there has been an input (YES in step S1130), the control device 50 switches the control to step S1160. Otherwise (NO in step S1130), control device 50 returns the control to step S1120. The control device 50 drives the next motor according to the abnormal noise generation list.

In step S1140, the control device 50 individually drives motors other than motors of the image forming units according to the occurrence cause list. The occurrence cause list is created in advance by a manufacturer of the image forming device 100.

In step S1150, the control device 50 determines whether there has been an input indicating that generation of abnormal noise has been confirmed or not. When determining that there has been an input (YES in step S1150), the control device 50 switches the control to step S1160. Otherwise (NO in step S1150), the control device 50 returns the control to step S1140. The control device 50 drives the next motor according to the occurrence cause list.

In step S1160, the control device 50 outputs the extracted abnormal noise generation location to the display area of the operation panel 203. As a result, the user can know where the abnormal noise has been generated.

As described above, the image forming device according to the present embodiment can support identification of the cause of the abnormal noise.

Ninth Embodiment

Figure 12:
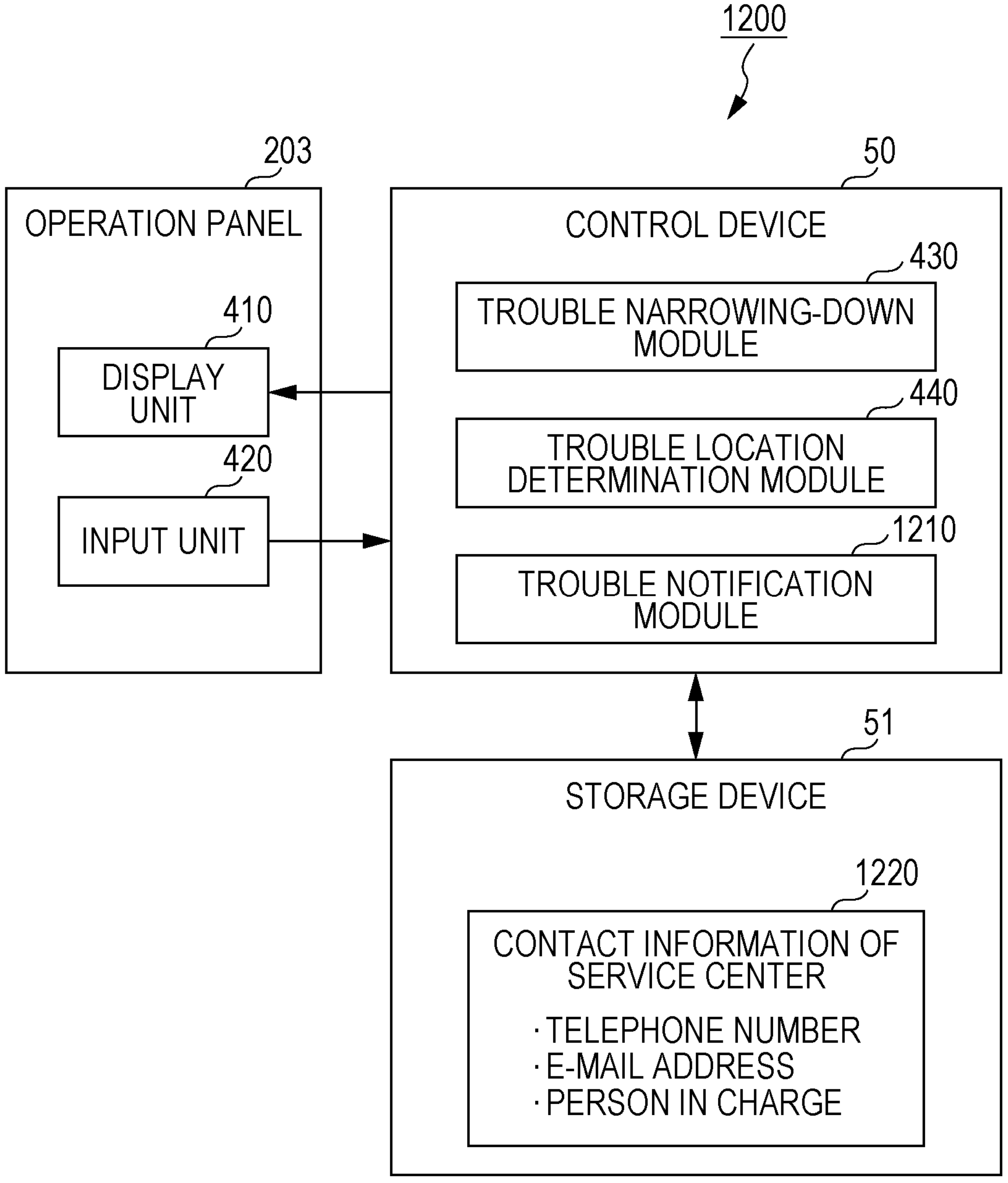
FIG. 12 is a diagram schematically illustrating a part of a configuration of an image forming device according to a ninth embodiment.

A ninth embodiment will be described with reference to FIG. 12. FIG. 12 is a diagram schematically illustrating a part of a configuration of an image forming device 1200 according to the ninth embodiment.

The image forming device according to the present embodiment is different from the image forming devices according to the above-described embodiments in that it has a function of notifying registered contact information of a trouble in a case where the trouble is detected.

As illustrated in FIG. 12, the control device 50 of the image forming device 1200 further includes a trouble notification module 1210 in addition to a trouble narrowing-down module 430 and a trouble location determination module 440. A storage device 51 includes contact information 1220 of a service center.

The trouble notification module 1210 notifies the contact information 1220 registered in advance of a trouble that has occurred in the image forming device 1200. The contact information 1220 includes a telephone number, an e-mail address, a name of a person in charge, and the like. A message transmitted at the time of notification of the trouble includes identification information (e.g., a model number and a serial number) of the image forming device 1200, a date and time when the message is transmitted, identification information of a sender of the message, and identification information of the trouble. The trouble identification information is a number predetermined for each trouble by a manufacturer of the image forming device 1200.

In one aspect, in a case where the image forming device 1200 detects occurrence of a trouble, the trouble may not be eliminated by changing the image formation condition. In this case, the image forming device 1200 transmits a message for notifying the contact information of the service center registered in advance of the trouble on the basis of its own determination or an instruction from a user (a manager) of the image forming device 1200. The message is a short message service (SMS), an electronic mail, an automatic voice call, a general telephone call, a facsimile, or the like. As a result, even in a case where the trouble cannot be eliminated by changing the image formation condition, it is easy to request component replacement or other repair for eliminating the trouble.

EFFECTS OF EMBODIMENTS

An image forming device according to each of the above-described embodiments can identify all malfunctions (troubles) that can occur in the image forming device. Even if the user does not have knowledge regarding the technique of the image forming device, the user can identify and cope with the malfunction.

Although embodiments of the present invention have been described and illustrated in detail, the disclosed embodiments are made for purposes of illustration and example only and not limitation. The scope of the present invention should be interpreted by terms of the appended claims, and is intended to include all modifications within the meaning and scope equivalent to the claims.

What is claimed is:

1. An information providing device comprising:

an input device that accepts an input to the information providing device;

a display device that displays a screen;

a control device that controls an operation of the information providing device; and a storage device that stores each of a plurality of trouble candidates that may occur in the information providing device, wherein the plurality of trouble candidates are respectively associated with a plurality of phenomena in the information providing device, each of the plurality of phenomena is associated with a cause analysis tree having predetermined hierarchies and including a plurality of causes, the control device displays the plurality of trouble candidates on the display device on a basis of the input, the control device displays one or more phenomena associated with a selected trouble candidate in a low hierarchy of the cause analysis tree on a basis of selection of any one of the plurality of trouble candidates, the control device displays one or more causes associated with the selected phenomenon on the display device on a basis of selection of any one of the one or more phenomena, the control device accepts the input until a cause in a bottom hierarchy is displayed on the display device, the control device changes a condition of image formation in the information providing device on a basis of a cause in the bottom hierarchy, the control device displays a plurality of sample images exemplifying change in the image quality on the display device on a basis of occurrence of change in an image quality in a case where the condition of image formation is changed, the input device accepts selection of any one of the plurality of sample images, and the control device changes setting of an image formation condition of the information providing device to a condition for forming a selected sample image.

2. The information providing device according to claim 1, wherein causes are respectively associated with possible countermeasures, and the control device accepts selection of a phenomenon until any one of the possible countermeasures is displayed on the display device.

3. The information providing device according to claim 1, wherein the control device collects state information indicating a state of the information providing device, and the control device narrows down the plurality of causes to a cause corresponding to the selected trouble candidate on a basis of the state information.

4. The information providing device according to claim 1 further comprising a replaceable image forming unit, wherein the storage device stores an image formation condition of the information providing device used before the image forming unit is replaced, and the control device returns the image formation condition to an image formation condition used before the image forming unit is replaced on a basis of replacement of the image forming unit.

5. The information providing device according to claim 1, wherein the input device accepts an input of identification information for identifying a user of the information providing device, the storage device holds a history of input by the user selecting each cause of the cause analysis tree, and the control device changes an order of displaying the plurality of sample images according to the history of input on a basis of the inputted identification information.

6. The information providing device according to claim 1, wherein the control device operates the information providing device such that a part designated in advance as a part where a trouble becomes noticeable among a plurality of parts related to the trouble candidate operates according to a cause of the trouble candidate.

7. The information providing device according to claim 1, wherein the control device notifies contact information registered in advance of a trouble requiring component replacement of the information providing device on a basis of determination that the trouble is not eliminated by changing an image formation condition of the information providing device in a case where a cause of the trouble candidate is identified.

8. A method executed by a computer that provides information on a device, the method comprising:

accepting an input to the computer;

displaying a screen;

controlling operation of the device; and accessing data indicating each of a plurality of trouble candidates that may occur in the device, wherein each of the plurality of trouble candidates is associated with a plurality of phenomena in the device, each of the plurality of phenomena is associated with a cause analysis tree having predetermined hierarchies and including a plurality of causes, and the method further comprises:

displaying the plurality of trouble candidates on a basis of the input;

displaying one or more phenomena associated with a selected trouble candidate in a low hierarchy of the cause analysis tree on a basis of selection of any one of the plurality of trouble candidates;

displaying one or more causes associated with the selected phenomenon on a basis of selection of any one of the one or more phenomena;

accepting the input until a cause in a bottom hierarchy is displayed on the display device;

changing a condition of image formation in the information providing device on a basis of a cause in the bottom hierarchy;

displaying a plurality of sample images exemplifying change in the image quality on the display device on a basis of occurrence of change in an image quality in a case where the condition of image formation is changed;

accepting selection of any one of the plurality of sample images; and changing setting of an image formation condition of the information providing device to a condition for forming a selected sample image.

9. The method according to claim 8, wherein causes are respectively associated with possible countermeasures, and the method further comprises accepting selection of a phenomenon until any one of the possible countermeasures is displayed.

10. The method according to claim 8, further comprising:

collecting state information indicating a state of the device; and narrowing down the plurality of causes to a cause corresponding to the selected trouble candidate on a basis of the state information.

11. The method according to claim 8, wherein the device includes an image forming unit, and the method further comprises:

saving an image formation condition of the device before the image forming unit is replaced;

accessing the image formation condition; and returning the image formation condition to an image formation condition used before replacement of the image forming unit on a basis of replacement of the image forming unit.

12. The method according to claim 8, further comprising:

accepting an input of identification information for identifying a user of the device;

accessing a history of input by the user selecting each cause; and changing an order of displaying the plurality of sample images according to the history of input on a basis of inputted identification information.

13. The method according to claim 8, further comprising operating the device such that a part designated in advance as a part where a trouble becomes noticeable among a plurality of parts related to the trouble candidate operates according to a cause of the trouble candidate.

14. The method according to claim 8, further comprising notifying contact information registered in advance of a trouble requiring component replacement of the device on a basis of determination that the trouble is not eliminated by changing an image formation condition of the device in a case where a cause of the trouble candidate is identified.

15. A non-transitory recording medium storing a computer readable program causing a computer to execute the method according to claim 8.

* * * * *